Dec. 27, 1955  M. G. ANDREW  2,728,326
MUZZLE
Filed Sept. 1, 1954
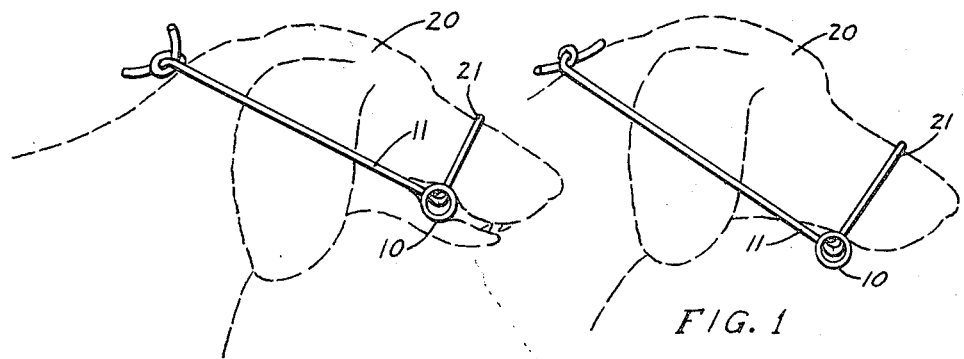
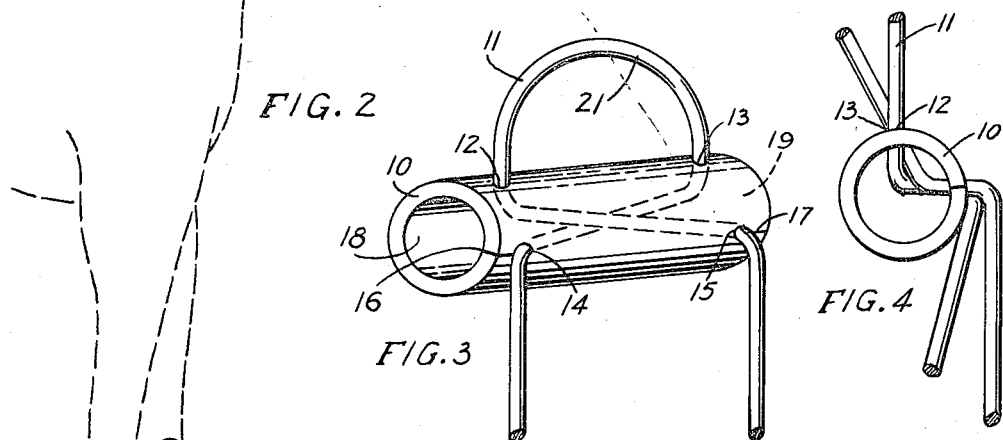
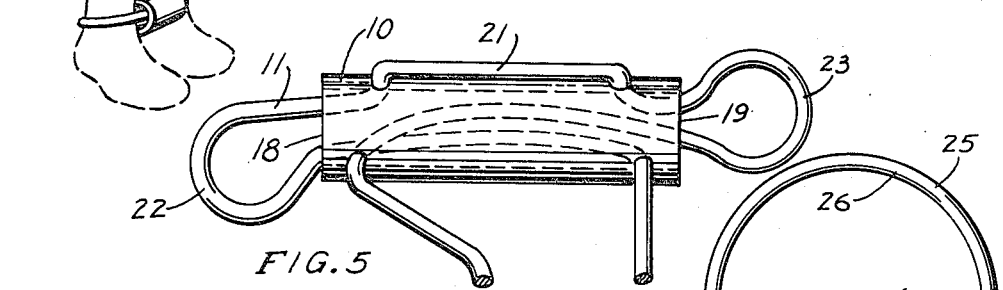
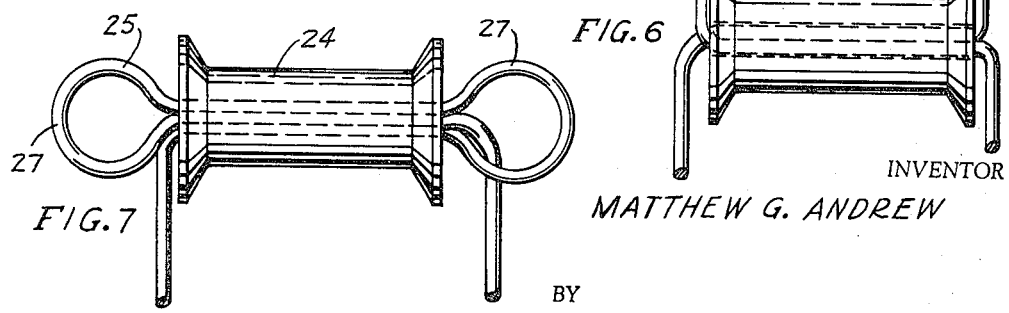
INVENTOR
MATTHEW G. ANDREW
BY
McMorrow, Berman + Davidson
ATTORNEYS United States Patent Office 2,728,326
Patented Dec. 27, 1955

2,728,326

MUZZLE

Matthew G. Andrew, Westboro, Wis.

Application September 1, 1954, Serial No. 453,532

2 Claims. (Cl. 119—129)

The present invention relates to new and useful improvements in muzzles and particularly applies to a light weight article to be carried by sportsmen, hunters and the like who wish to have a convenient muzzle and hobble handy for emergencies to save themselves from bites and scratches of animals that they handle.

The particular usefulness of the present invention will be apparent to handlers of hunting dogs which encounter and attempt to engage in pursuit of or battle with porcupines, and find themselves lacerated and transfixed by the porcupine quills. The present invention permits the temporary tying of the injured dog by its forefeet or by either jaw, if the quills are in its mouth, so that the dog can safely be held while the quills are extracted.

The principal object of the present invention is to provide, therefore, a simple and light weight article which forms a muzzle for an animal.

Another object of the present invention is to provide a relatively small and compact article to form a muzzle, and one which may engage the both jaws of an animal.

A further object of the present invention is to provide an inexpensive device which may easily be carried practically unnoticed in the pocket of a hunting coat and one which may be easily manufactured and assembled by unskilled persons, and one which may be made in any desired size to fit different size animals.

These and other objects and advantages of the present invention will be fully apparent from the following description when considered in connection with the annexed drawings, in which:

Figure 1 is a representation of a dog's head with a first embodiment of the present invention used as a muzzle;

Figure 2 is another representation of a dog showing the invention shown in Figure 1 in use as a bridle and as a hobble;

Figure 3 is a view in perspective showing in dotted lines how the free ends of the strand portion of the invention are crossed;

Figure 4 is an end view of the first embodiment of the present invention;

Figure 5 is a side view in elevation of the first embodiment of the invention with the end loops formed to serve as a hobble;

Figure 6 shows a second embodiment of the invention formed with a jaw engaging bight as in Figures 1-3; and Figure 7 is a view of the second embodiment formed with end loops for use as a hobble.

Referring in more detail to the invention, in Figures 1 to 5 it will be seen that in the invention the first embodiment consists of a first element, a cylindrical or tubular body 10 and a second element, an elongated flexible strand 11, made of rawhide, cord, or other material which is strong and flexible. The body 10 may be formed from wood, plastic or from a light weight metal such as aluminum, magnesium or the like.

The body 10 is open at both ends and is formed with a first pair of apertures 12 and 13 arranged in longitudinal spaced relation intermediate its ends, there being formed in the body 10 intermediate its ends a second pair of apertures 14 and 15 arranged in longitudinal spaced relation, the second pair of apertures 14 and 15 being spaced from the first pair of apertures 12 and 13. The second pair of apertures 14 and 15 are joined by slots 16 and 17 to the open ends of the body 18, 19, respectively.

In Figures 3 to 5, it will be seen that the strand 11 projects in a bight 21 from one pair of apertures 12 and 13 and projects by its free ends from the other pair of apertures 14 and 15, crossing on itself in the body 10. In Figure 5, the bight 21 is collapsed while the strand is pulled out of each open end of the body to form loops 22, and 23. The apertures 14 and 15 are connected to the open ends by the slots so that a quick assembly may be made if desired, as in Figures 1 and 2, on the head of a dog 20 with the free ends tied at the back of its head.

Figures 6 and 7 show how an empty spool 24 may be used with a strand 25 to form the same effective muzzle bight 26 and hobble loops 27 without the necessity of any apertures in the sides.

It is believed to be fully apparent from the illustrations that the invention will be useful on horses as well as dogs, and in the case of small animals whose forefeet may be lashed to their heads, the device will be useful in their capture and treatment, and they can be bound head to forefeet with little danger to the handler.

While only single embodiments of the present invention have been shown and described, other embodiments are contemplated and many changes and modifications of the present invention will be possible within the scope of the appended claims without departing from the spirit thereof.

What is claimed is:

1. A muzzle for animals comprising a body open at both ends and formed with a first pair of apertures arranged in longitudinal spaced relation intermediate its ends, there being formed in said body intermediate its ends a second pair of apertures arranged in longitudinal spaced relation, said second pair of apertures being spaced from said first pair of apertures, a flexible strand projecting in a bight from said first pair of apertures and by its free ends from said second pair of apertures, said strand being crossed on itself in said body, said bight being adapted to engage one or both jaws of an animal, and said free ends being engageable with each other to secure said bight in releasable locked engagement.

2. A muzzle for animals comprising a body open at both ends and formed with a first pair of apertures arranged in longitudinal spaced relation intermediate its ends, there being formed in said body intermediate its ends a second pair of apertures arranged in longitudinal spaced relation, said body having slots extending from its open ends to each of said second pair of apertures, said second pair of apertures being spaced from said first pair of apertures, a flexible strand projecting in a bight from said first pair of apertures and by its free ends from said second pair of apertures and associated slots, said strand being crossed on itself in said body, said bight being adapted to engage one or both jaws of an animal, and said free ends being engageable with each other to secure said bight in releasable locked engagement.

References Cited in the file of this patent

UNITED STATES PATENTS

| 267,877 | Gustaveson | Nov. 21, 1882 |
| 664,263 | Gorringe et al. | Dec. 18, 1900 |
| 917,951 | Krause | Apr. 13, 1909 |
| 1,290,355 | Richardson | Jan. 7, 1919 |
| 2,604,069 | Hobby | July 22, 1952 |

FOREIGN PATENTS

| 375,120 | Germany | May 7, 1923 |